United States Patent
Nielsen et al.

(10) Patent No.: US 11,965,486 B2
(45) Date of Patent: Apr. 23, 2024

(54) WIND ENERGY PARK COMPRISING A WIND TURBINE AND AN AIRBORNE WIND ENERGY SYSTEM

(71) Applicant: Vestas Wind Systems A/S, Aarhus N. (DK)

(72) Inventors: Thomas S. Bjertrup Nielsen, Randers Sv (DK); Torben Ladegaard Baun, Skødstrup (DK)

(73) Assignee: Vestas Wind Systems A/S, Aarhus N. (DK)

( * ) Notice: Subject to any disclaimer, the term of this patent is extended or adjusted under 35 U.S.C. 154(b) by 623 days.

(21) Appl. No.: 16/973,060

(22) PCT Filed: Jun. 13, 2019

(86) PCT No.: PCT/DK2019/050186
§ 371 (c)(1),
(2) Date: Dec. 8, 2020

(87) PCT Pub. No.: WO2019/242822
PCT Pub. Date: Dec. 26, 2019

(65) Prior Publication Data
US 2021/0270237 A1 Sep. 2, 2021

(30) Foreign Application Priority Data
Jun. 21, 2018 (DK) .............. PA 2018 70427

(51) Int. Cl.
*F03D 7/04* (2006.01)
*F03D 5/00* (2006.01)
(Continued)

(52) U.S. Cl.
CPC .............. *F03D 7/048* (2013.01); *F03D 5/00* (2013.01); *F03D 9/257* (2017.02); *F03D 9/30* (2016.05);
(Continued)

(58) Field of Classification Search
CPC . F03D 7/048; F03D 9/257; F03D 9/30; F05B 2220/705; F05B 2240/917;
(Continued)

(56) References Cited

U.S. PATENT DOCUMENTS 8,922,041 B1   12/2014 North et al.
9,886,864 B1    2/2018 Chubb et al.
(Continued)

FOREIGN PATENT DOCUMENTS

CN   103080540 A   5/2013
CN   105715452 A   6/2016
(Continued)

OTHER PUBLICATIONS

Antonello Cherubini et al., Airborne Wind Energy Systems: A review of the technologies, Renewable and Sustainable Energy Reviews, 51 (2015) 1461-1476.
(Continued)

*Primary Examiner* — David E Sosnowski
*Assistant Examiner* — Jason G Davis
(74) *Attorney, Agent, or Firm* — Wood Herron & Evans LLP (57) ABSTRACT

A wind park with wind turbines and airborne wind energy systems where a first zone and a second zone is defined for at least one of the airborne wind energy systems such that the risk of collision between apart of that airborne wind energy systems and a part of one of the wind turbines is higher when the airborne unit of that airborne wind energy system is in the second zone than when it is in the first zone, and different control parameters are applied to the control of at least one of the wind turbine and the airborne wind energy system depending on the position of the airborne unit relative to the defined zones.

16 Claims, 9 Drawing Sheets

(51) Int. Cl.
*F03D 9/25* (2016.01)
*F03D 9/30* (2016.01)

(52) U.S. Cl.
CPC . *F05B 2220/705* (2020.08); *F05B 2240/9174* (2020.08); *F05B 2240/96* (2013.01); *F05B 2270/00* (2013.01)

(58) Field of Classification Search
CPC ...... F05B 2240/9172; F05B 2240/9174; F05B 2240/96; F05B 2270/00
See application file for complete search history.

(56) References Cited

U.S. PATENT DOCUMENTS

| 2007/0126241 | A1  | 6/2007  | Olson |
| 2009/0185900 | A1* | 7/2009  | Hirakata ................ F03D 17/00 416/31 |
| 2014/0312920 | A1  | 10/2014 | Hirota et al. |
| 2015/0039161 | A1  | 2/2015  | Hastings et al. |
| 2015/0308413 | A1  | 10/2015 | Bhaskar et al. |

FOREIGN PATENT DOCUMENTS

| CN | 108026895 A   | 5/2018  |
| EP | 3184813 A1    | 6/2017  |
| WO | 2010122292 A2 | 10/2010 |
| WO | 2018206063 A1 | 11/2018 |

OTHER PUBLICATIONS

Danish Patent and Trademark Office, Search and Examination Report in PA 2018 70427, dated Feb. 21, 2019.
European Patent Office, International Search Report and Written Opinion in PCT Application No. PCT/DK2019/050186, dated Sep. 10, 2019.
China National Intellectual Property Administration, office action issued in corresponding Chinese Application No. 201980040459.5, dated Apr. 20, 2023, with English translation.

* cited by examiner

WIND ENERGY PARK COMPRISING A WIND TURBINE AND AN AIRBORNE WIND ENERGY SYSTEM

FIELD OF THE INVENTION

The present invention relates to a method of operating a wind park, comprising at least one wind turbine and at least one airborne wind energy system.

The wind turbine comprises a tower, at least one nacelle mounted on the tower, and a rotor coupled to each nacelle. The rotor is rotatable about a rotation axis for generating electrical energy for a power grid. The airborne wind energy system comprises an airborne unit, a base, and a cable connecting the airborne unit to the base.

BACKGROUND

Modern wind turbines are used for generating electrical energy for a power grid. For this purpose, a set of wind turbine blades coupled to a rotor are directed into the incoming wind, and the energy of the wind is extracted by the wind turbine blades which are caused to rotate and thereby convert the energy of the wind into mechanical energy. The rotor is connected to a generator, and the mechanical energy of the rotating rotor is therein converted into electrical energy. The electrical energy is supplied to a power grid, via suitable components. The connection of the rotor to the generator could be a direct connection, i.e. where the rotor rotates with the speed of the rotor part of the generator, or via a gear arrangement causing a speed change between The power production of a wind turbine depends on the wind conditions at the site of the wind turbine, including the wind speed. At wind speeds below a specified minimum wind speed, sometimes referred to as the cut-in wind speed, no electrical energy is generated by the wind turbine. At wind speeds between the cut-in wind speed and a nominal wind speed, the power produced by the wind turbine gradually increases as the wind speed increases, until a nominal power production is reached at the nominal wind speed. At wind speeds above the nominal wind speed, the power production of the wind turbine is limited to the nominal power production. However, at wind speeds above a maximum wind speed, sometimes referred to as the cut-out wind speed, the wind turbine is stopped or operated at reduced power production in order to prevent damage to the wind turbine.

The power production, including the above mentioned control steps, is governed by a set of control parameters including parameters controlling the yaw angle of the nacelle rotation relative to the tower, and the pitch angle of the blades.

Various airborne wind energy systems, being capable of capturing wind energy at a higher altitude than traditional wind turbines, are known. Common to these systems is that an airborne unit of the system is launched to a high altitude, where energy of the wind is harvested. The harvested energy is transferred from the airborne unit to a base station, either in the form of mechanical energy or in the form of electrical energy. In the case that the transferred energy is in the form of mechanical energy, a generator will normally be arranged at the base station in order to convert the mechanical energy into electrical energy. In the case that the transferred energy is in the form of electrical energy, the airborne wind energy system comprises an airborne generator carried by the airborne unit, i.e. the part of the system which is launched to a high altitude includes a generator. The airborne unit may include a kite or a glider.

A number of airborne wind energy systems are described in Cherubini, et al., 'Airborne Wind Energy Systems: A review of the technologies', Renewable and Sustainable Energy Reviews, 51 (2015) 1461-1476.

US 2007/0126241 discloses a wind driven apparatus for an aerial power generation system including driven elements and controls. The driven elements are configured and shaped to provide maximum force from both lift and drag during the downwind phase of operation and minimum force during the upwind phase. The driven elements have a sail portion with a leading edge and a trailing edge. The controls change the driven elements between high force configurations for downwind operation and low force configurations for upwind operation, adjust the pitch and azimuth angles of the driven elements, and control the camber. In one embodiment, the driven elements are attached to a shaft being rotatably mounted on a nacelle on top of a tower.

The power production and the location of the air borne unit is controlled by a set of control parameters controlling inter alia the above mentioned pitch and azimuth angles of the driven elements, the cable length between the base station and the airborne unit and other parameters.

In a traditional wind park, the individual wind turbines have a fixed location on ground and collision is not an issue. In a park of airborne wind energy systems, there could be a risk of entanglement, but damage of highly expensive rotor components of wind turbines is not an issue.

Airborne wind energy systems can with benefit be placed on, and operate from, a wind turbine or the airborne wind energy system can be placed on the ground near a wind turbine. In parks which combine wind turbines and airborne wind energy systems, there is a risk of non-optimal operating conditions, e.g. if turbulent wind conditions caused by the wind turbine or the airborne wind energy system reduces the efficiency of the other one or of the wind turbine and airborne wind energy system. Further, there is a risk of collision between the airborne wind energy system and the wind turbine. Accordingly, there is a need for an improved control.

DESCRIPTION

It is an object of embodiments of this disclosure to provide an improved security and reduced risk of collision in a park comprising at least one wind turbine and at least one airborne wind energy system. It is a further object to allow increased energy production and avoid unnecessary suspension of the energy production.

According to a first aspect, the disclosure provides a method of operating a wind park, comprising at least one wind turbine and at least one airborne wind energy system.

The method relates to a park where the wind turbine comprises a tower and at least one nacelle mounted on the tower and a rotor coupled to the nacelle and rotatable about a rotation axis for generating electrical energy for a power grid.

The airborne wind energy system to which the method relates comprises an airborne unit, a base, and a cable connecting the airborne unit to the base.

The method comprises the steps of:
defining for at least one of the airborne wind energy systems, a first zone and a second zone such that the risk of collision between a part of one of the airborne wind energy systems and a part of one of the wind turbines is higher when the airborne unit of that airborne wind energy system is in the second zone than when it is in the first zone.

By means of an example, the first and second zones may be defined such that collision between the airborne wind energy system and a wind turbine is possible in the second zone but not possible in the first zone. The first and second zones may e.g. be defined at least partly based on a location of the wind turbine and a location of the base.

The method further comprises:

determining a position of the airborne unit, and applying a first set of control parameters to the control of at least one of the wind turbine and the airborne wind energy system if the position of the airborne unit is in the first zone, and applying a second set of control parameters to the control of at least one of the wind turbine and the airborne wind energy system if the position of the airborne unit is in the second zone.

According to the method, the first and second zones indicate different levels of risk of collision. The zones may be based on static information, e.g. related to the locations of the wind turbines near the airborne wind energy system to which the zones are applied and the base of the airborne wind energy system itself. Such information may be used for defining the first and second zones. The zones thereby indicate a level of risk of collision and/or a level of risk of non-optimal operating conditions. The position of the airborne unit relative to the defined zones determines which set of control parameters to apply. Accordingly, the control depends on the position of the airborne unit relative to the first and second zones and thereby relative to the risk of collision or non-optimal operating conditions, and the method therefore improves the conditions of operating with a wind park with a combination of wind turbines and airborne wind energy systems.

The method may further comprise defining a third zone in which collision between the wind turbine and the airborne wind energy system is more likely to occur than in the second zone and applying a third set of control parameters of at least one of the wind turbine and the airborne wind energy system if the airborne unit is within the third zone.

The first, the second, and the third zones may be considered as a green, yellow and red zone where the alertness is higher in the yellow and even higher in the red zone.

The wind turbine could be any type of wind turbine. A traditional wind turbine, e.g. a horizontal axis wind turbine, with an energy generating unit in the form of a nacelle mounted on top of a tower, a vertical axis wind turbine or it could be a multiple rotor wind turbine where one tower structure carries several energy generating units. The wind turbine could as well be upwind or downwind pitch or stall wind turbines in some versions with eg. tethered blades or blades with hinges.

The energy generating unit is normally mounted on the tower via a yaw bearing, allowing the nacelle to perform yawing movements relative to the tower in order to direct the wind turbine blades into the incoming wind. Herein, we refer to the yaw system and yaw angle. Further the wind turbine may be able to control the rate of conversion from wind energy to electrical energy, e.g. including a system for pitching the blades, herein referred to as pitching system and pitching angle. The conversion rate may also be controlled by controlling the generator or other equipment of the wind turbine, including a rotor brake etc.

An "airborne wind energy system" is herein defined as a system comprising a base and an airborne unit. The airborne unit is a part which is launched to a higher altitude than the base and which is capable of capturing wind energy. The base and the airborne unit are connected by a cable. The harvested energy is transferred to a base station, either in the form of mechanical energy or in the form of electrical energy, i.e. the generator of the airborne wind energy system could be located at the base or at the airborne unit.

The base could be connected directly to the wind turbine, or the base could be located adjacent to the wind turbine. When connected directly to the wind turbine the base can be placed at the nacelle of the wind turbine where the base yaw together with the rotor and nacelle of the wind turbine or the base can be placed at the tower or foundation of the wind turbine, where a system for yawing the base together with the rotor and nacelle yaw position are to be included.

The cable may be electrically conductive. In this case, the cable may be configured for transmitting power in the form of AC current or DC current and/or for transmitting communication signals. As an alternative, the cable may merely be configured for mechanically attaching the airborne wind energy system to the wind turbine, but is not used for transmitting electrical current. In this case the cable may, e.g., be in the form of a rope, a wire or the like.

The airborne unit could e.g. be a soft kite, a hard kite, or a kite of the type known inter alia from the company called Makani™.

The position of the airborne unit can be determined by the use of a GPS (global positioning system) at the kite, by measuring the cable angle and length etc.

Different parameters determine the conditions for the wind park. Herein, we divide the parameters in two groups. The first of the two groups is herein referred to as "operating conditions", i.e. conditions which the wind park is subjected to and conditions which can not be changed by control actions. The second of the two groups is herein referred to as "control parameters.

Herein, the term "wind park control parameters" include parameters controlling the wind park and it includes parameters controlling both the wind turbine and the airborne wind energy system. The term "wind turbine control parameters" include the parameters controlling the wind turbine, inter alia the yaw angle of the nacelle rotation relative to the tower, the rotor azimuth angle, the pitch angle of the blades and the pivot angle for tethered or hinged blades determine the blade positions in the 3D space.

The term "airborne energy system parameters" include the parameters controlling the airborne energy system e.g. including cable length or azimuth angles of driven elements of the airborne unit and generally whatever control parameter which is available for controlling the airborne wind energy system. The term "control parameter" is a parameter within the three groups, wind park control parameter, wind turbine control parameter, or airborne energy system control parameter.

The first zone, the second zone, and the third zone each define a three dimensional space, and they could be defined e.g. by definition of corner coordinates of the space.

Since the risk of non-optimal operating conditions and collision may depend not only on static information, e.g. the location of the wind turbine and the location of the airborne wind energy system, the method may comprise the step of redefining the first and second zones, e.g. based on a wind speed, a wind direction, or a length of the cable. The first two parameters are operating conditions, and the latter, i.e. the length of the cable, is a control parameter. I.e. once a specific operating condition is established, or once a specific control parameter is selected, the first zone could be redefined.

The redefining of the first or second zone may be carried out while electrical energy is generated by at least one of the wind turbine or the airborne wind energy system, and it may be carried out continuously, or it may be carried out each time an operating condition or a control parameter is changed, or each time an operating condition or a control parameter is changed beyond the limit of a threshold value, i.e. e.g. in response to an operating condition or a control parameter being changed more than a predetermined percentage etc.

The method may include the step of defining at least one static zone which is not re-definable, i.e. at least one of the first, the second, and the third zones may not be redefinable. Since the static zone is not changed, errors which may derive from the redefinition of the first zone may be omitted.

The method may include the step of applying a fourth set of control parameters to the control of at least one of the wind turbine and the airborne wind energy system if the position of the airborne unit is outside the static zone, and applying a fifth set of control parameters to the control of at least one of the wind turbine and the airborne wind energy system if the position of the airborne unit is inside the static zone.

The method may particularly be carried out by a computer system, particularly by a computer system configured to define the control parameters and control the wind turbine and/or the airborne wind energy system. In this case, the first zone is defined in the computer system, and the computer system is configured, based on the location of the airborne unit, to select the first or the second set of control parameters and subsequently to execute the control accordingly.

The airborne wind energy system may be partly integrated in the wind turbine, and particularly, the computer system may be a shared computer system configured for controlling a wind turbine and a corresponding airborne wind energy system, or for controlling all wind turbines and all airborne wind energy systems of the wind park.

The set of control parameters may comprise at least one of an orientation of the rotation axis or a speed of the rotor of the wind turbine, or it may comprise a length of the cable, a cable roll in and out speed, and a position of the airborne unit of the airborne wind energy system.

The set of operational parameters could be applied to one single entity of the wind park, i.e. to one wind turbine or to one airborne wind energy system, or it could be applied to more than one wind turbine or airborne wind energy system of the wind park. I.e. a plurality of wind turbines could operate with the same set of control parameters based on the location of one airborne unit relative to a zone, or a plurality of airborne wind energy systems could operate with the same set of control parameters based on the location of one airborne unit relative to a zone.

In a second aspect, the disclosure relates to a wind park, comprising at least one wind turbine and at least one airborne wind energy system, the wind turbine comprising a tower placed on a foundation. The wind turbine further comprises at least one nacelle mounted on the tower and a rotor coupled to the nacelle and rotatable about a rotation axis for generating electrical energy for a power grid. The airborne wind energy system comprises an airborne unit, a base, and a cable connecting the airborne unit to the base.

The wind park further comprises an electronic data storage and an electronic controller operable on data in the data storage. The data storage contains a data set for at least one of the airborne wind energy systems. This data set comprises at least a first zone data set defining a first zone, and a second data set defining a second zone such that the risk of collision between the wind turbine and the airborne wind energy system of the airborne wind energy system in question is higher in the second zone.

The wind park further comprises a position determining structure configured for determining a position of the airborne unit, and the electronic controller is configured to process the position data and the first zone data and the second zone data, and based thereon to determine if the airborne unit is in the first zone or in the second zone.

If the airborne unit is in the first zone, the controller is configured to apply a first set of control parameters to control of at least one of the wind turbine and the airborne wind energy system, and if the position of the airborne unit is in the second zone, the controller is configured to apply a second set of control parameters to the control of at least one of the wind turbine and the airborne wind energy system.

The electronic data storage may comprise at least a third zone data set defining a third zone in which collision between the wind turbine and the airborne wind energy system is more likely to occur than in the second zone and wherein the electronic controller is configured to apply a third set of control parameters of at least one of the wind turbine and the airborne wind energy system if the airborne unit is within the third zone.

The electronic controller could be configured to redefine at least one of the first, second, and third zone based on a wind speed, a wind direction, and a length of the cable.

The controller may also be configured to redefine at least one of the first, second, and third zone while electrical energy is generated.

The controller could be configured to redefine at least one of the first, second, and third zone while the set of control parameters of at least one of the wind turbine and the airborne wind energy system are applied for controlling operation.

The controller could be configured to redefine at least one of the first, second, and third zone continuously.

The wind park according to the second aspect may include any of the features mentioned relative to the method of the first aspect.

The disclosure further provides a wind turbine for a wind part according to the second aspect, an airborne wind energy system for a wind part according to the second aspect, and a computer system comprising electronic data storage and an electronic controller operable on data in the data storage to perform the method of the first aspect of the invention.

BRIEF DESCRIPTION OF THE DRAWINGS

The invention will now be described in further detail with reference to the accompanying drawings in which.

DETAILED DESCRIPTION OF THE DRAWINGS

Figure 1A:
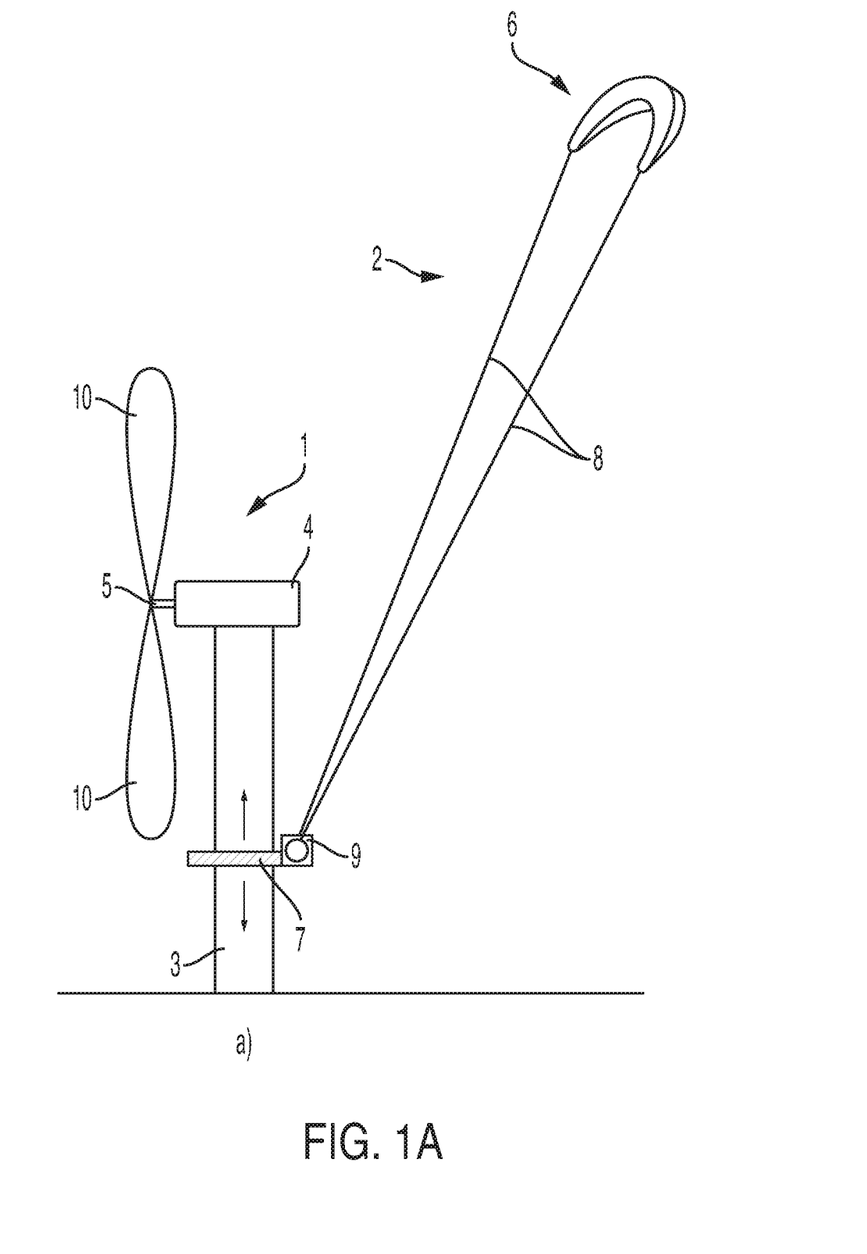
FIGS. 1-5 illustrate wind parks according to three different embodiments and with one wind turbine and airborne wind energy system.

FIG. 1a illustrates a wind park with a single wind turbine 1 and a single airborne wind energy system 2.

The wind turbine 1 comprises a tower 3 and a nacelle 4 mounted on the tower 3.

A rotor 5 is coupled to the nacelle 4 in a manner which allows the rotor 5 to rotate relative to the nacelle 4 when wind is acting on wind turbine blades 10 mounted on the rotor 5.

The airborne wind energy system 2 comprises an airborne unit 6 and a base 7. The base and the airborne unit are connected by the cable 8. In the illustrated embodiment, the base 7 is placed at the tower 3, with a system that rotates around the tower according to the yaw position of the nacelle and rotor of the wind turbine, but it could also have a location at a distance from the wind turbine.

By extracting or retrieving the cable 8, the winch 9 rotates, and electrical energy is generated at the base 7 by a generator.

The cable 8 may be extracted and retrieved by means of movements of the airborne unit 6 which in this case is in the form of a kite. This will be described in further detail below. The energy generated by the airborne wind energy system is, according to this embodiment, transferred to the wind turbine 1 in the form of mechanical energy, where after it is transformed to electrical energy by the generator.

The kite 6 may be launched in a direction pointing away from the wind turbine blades 10, but collision may still be an issue relative to adjacent wind turbines of the wind park.

It can be seen that the kite 6 is launched to an altitude which is well above the wake created by the wind turbine 1. Furthermore, the wind speeds prevailing at this altitude are expected to be generally higher than the wind speeds prevailing at the altitude of the rotor 5 of the wind turbines 1. This provides a good utilisation of the available wind at the site of the wind turbines 1, and the total energy production of the site can thereby be increased as compared to a situation where airborne wind energy systems are not coupled to the wind turbines 1.

Typically, the kite 6 is able to move along specified movement paths.

Figure 1B:
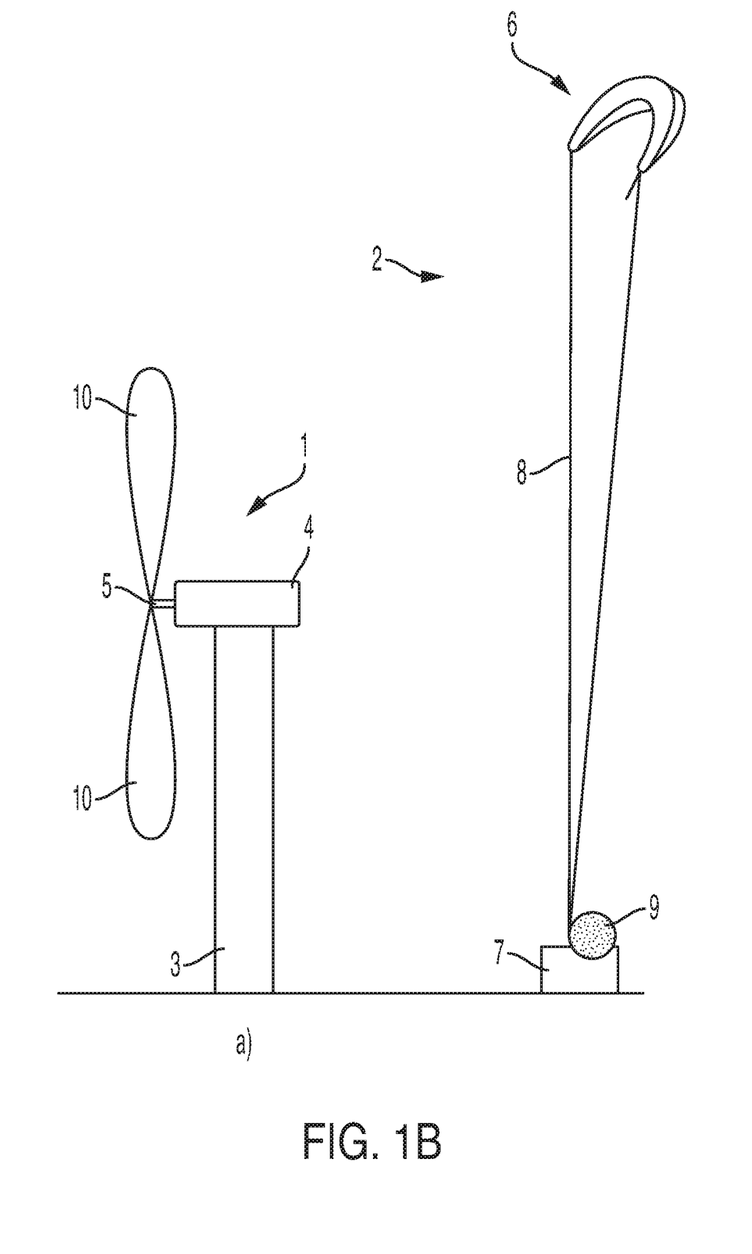

FIG. 1b illustrates a wind park with a single wind turbine and an airborne wind energy system. In this embodiment the base of the airborne wind energy system is at the ground adjacent to the wind turbine.

Figure 2:
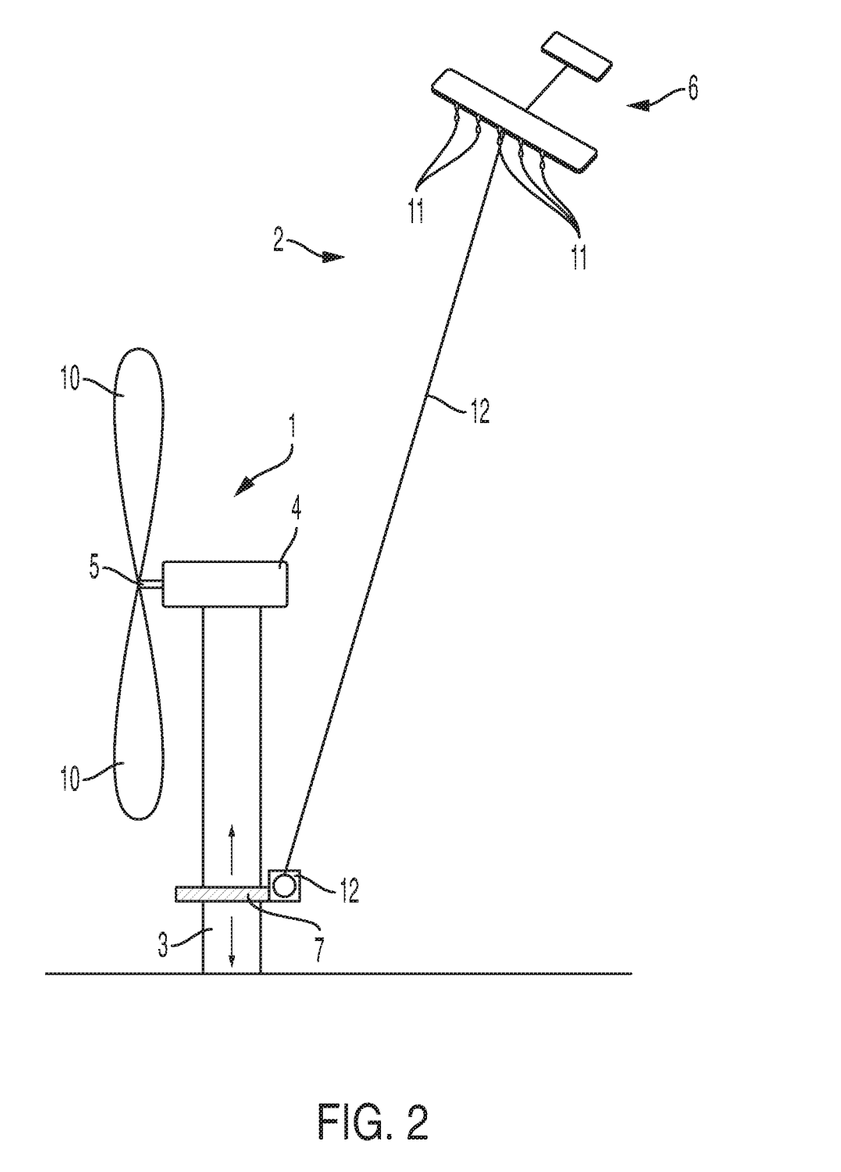

FIG. 2 illustrates an embodiment, where the airborne unit is a glider or similar which is provided with rotors 11 which are capable of generating electrical energy locally at the airborne unit. The generated electrical energy is transferred to the base via an electrically conducting cable 12. The winch 12 is used for retrieving and launching of the glider.

Here the electrical energy is supplied to a suitable electrical component of the base 7.

Figure 3:
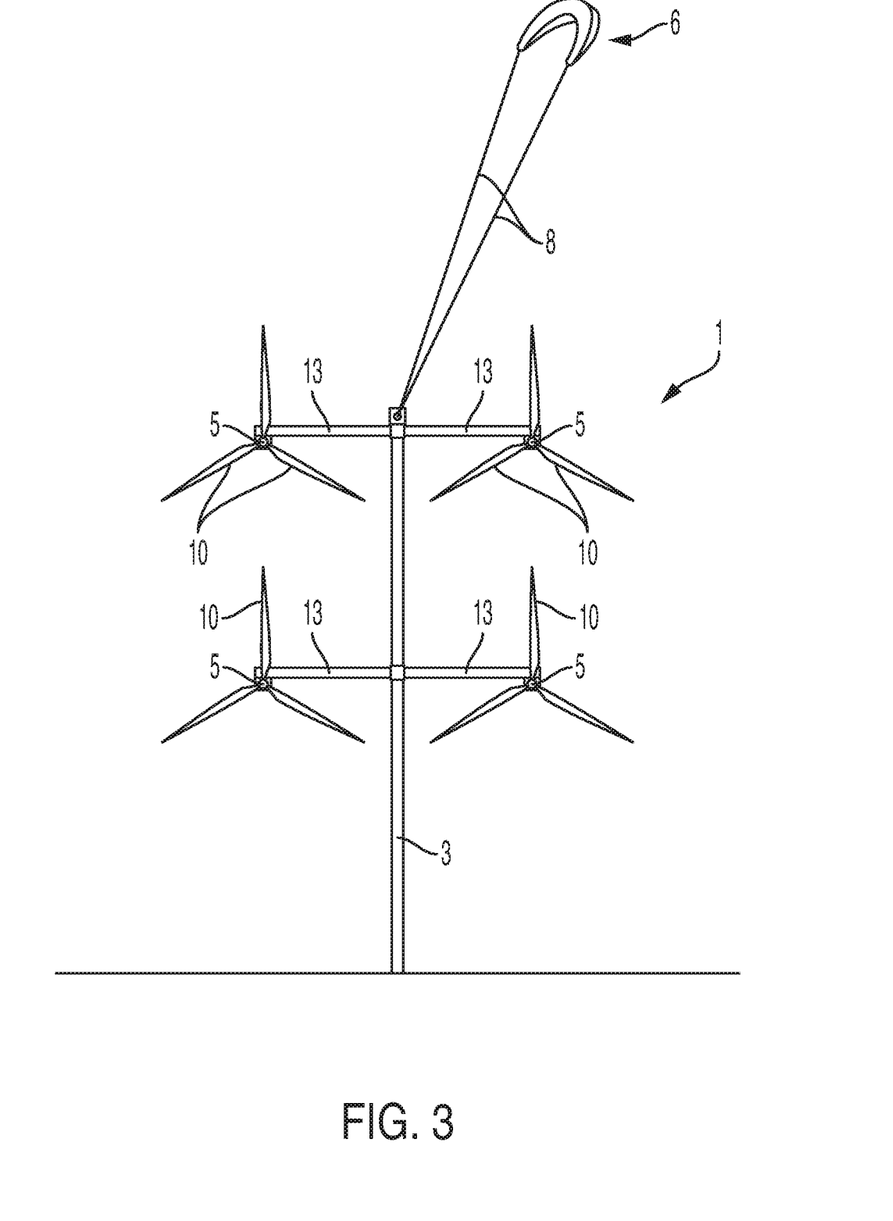

FIG. 3 illustrates a wind park with a single multiple rotor wind turbine and an airborne wind energy system. The wind turbine 1 comprises four rotors 5, each mounted on an arm 13 mounted on the tower 3. Thus, the wind turbine 1 of FIG. 3 is a multirotor wind turbine.

An airborne wind energy system in the form of a kite 6 is mounted on the wind turbine 1 at the top of the tower 3, by means of a cable 8. Since the rotors 5 are mounted on the arms 13, at a distance from the tower 3, the wind turbine blades 10 are well clear of the mounting position of the kite 6. Accordingly, the risk of collisions between the wind turbine blades 10 and the kite 6 or the cable 8 is low. However, there remains a risk of collision, not least between the airborne energy system and adjacent wind turbines.

Figure 4:
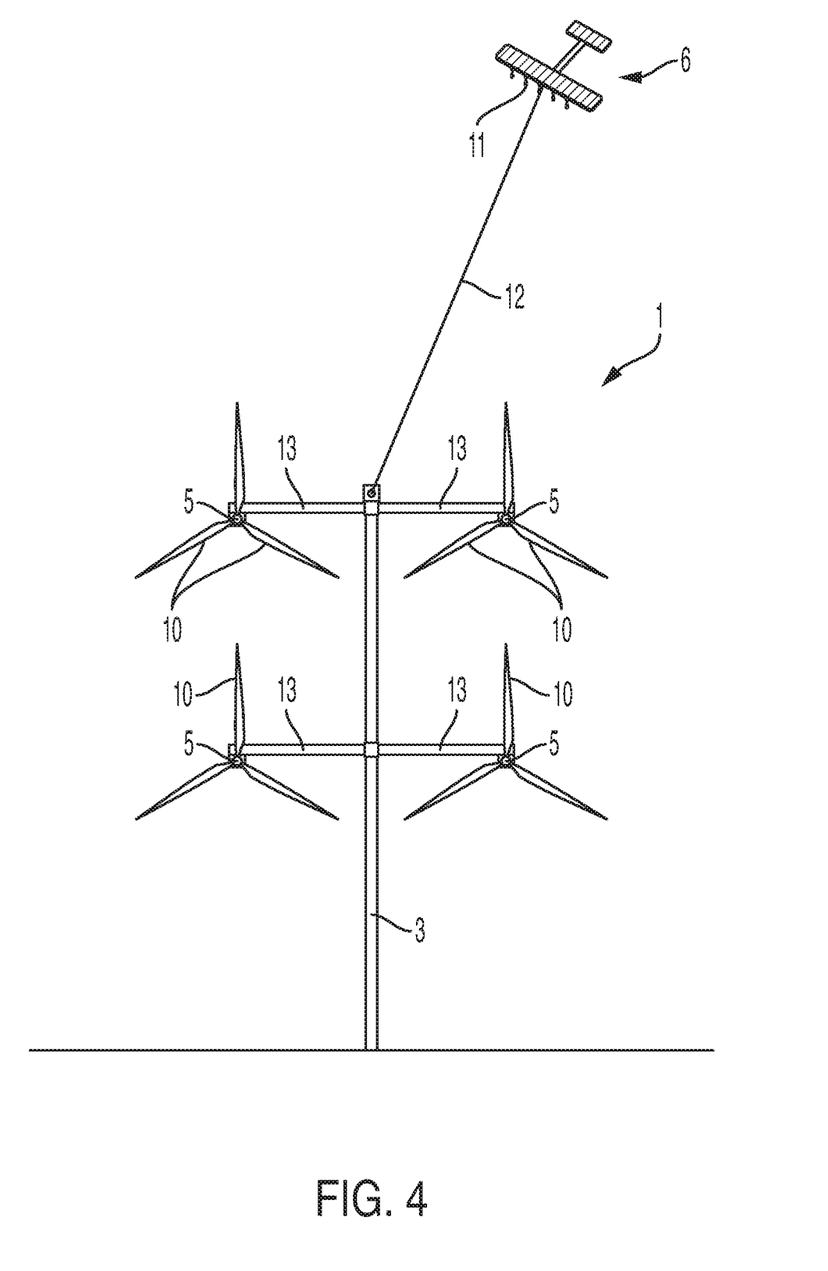

FIG. 4 illustrates the wind turbine from FIG. 3 but with a glider of the kind mentioned relative to FIG. 2.

Figure 5A:
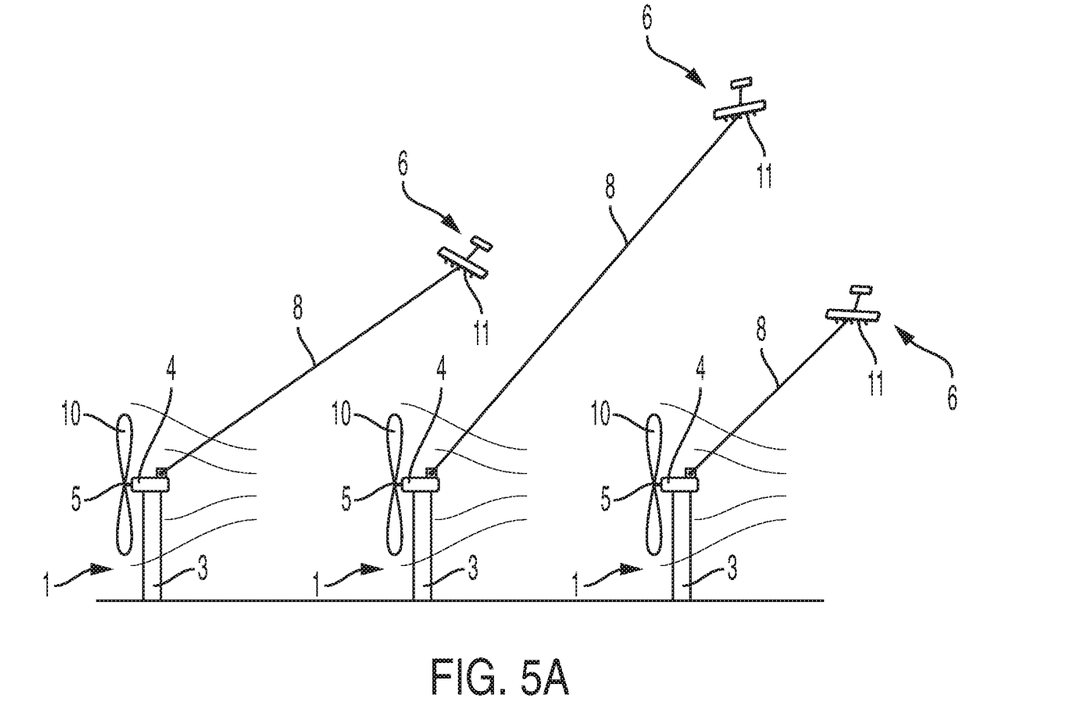

FIG. 5a illustrates the wind park in FIG. 2 but with a plurality of wind turbines and airborne wind energy systems. In this embodiment the bases of the airborne wind energy systems are found at the nacelle of the wind turbines. This enables that the base yaw together with the rotor and nacelle of the wind turbine.

Figure 5B:
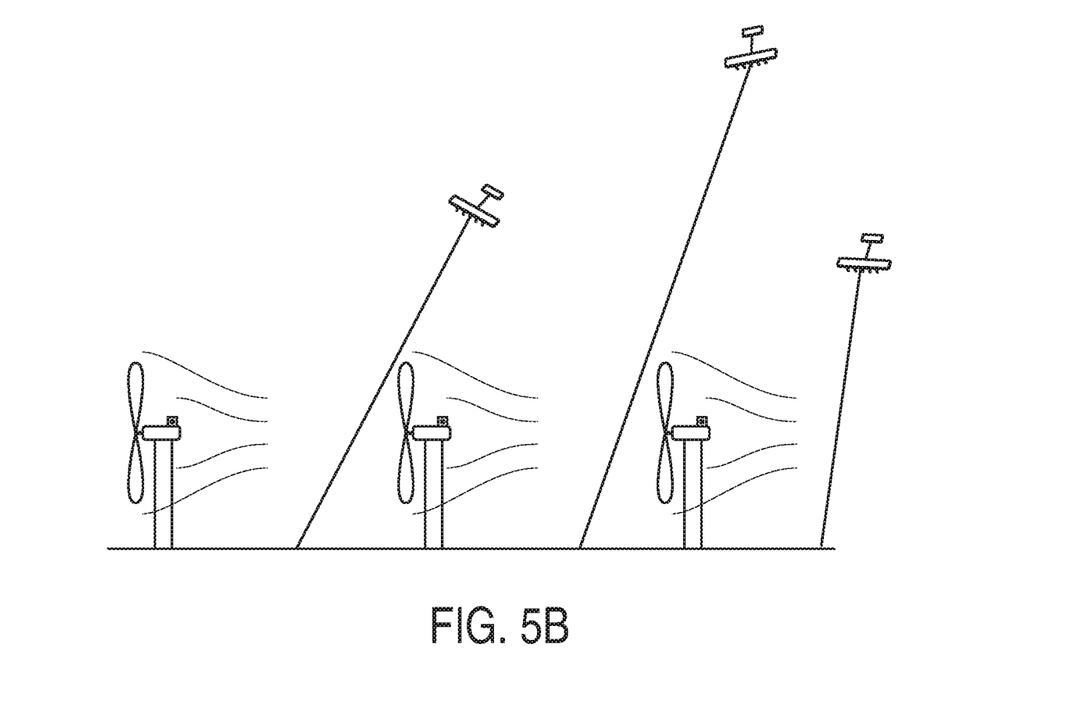

FIG. 5b illustrates a wind park with a plurality of wind turbines and airborne wind energy systems. In this embodiment the bases of the airborne wind energy systems are at the ground at a distance from the wind turbines.

Figure 6:
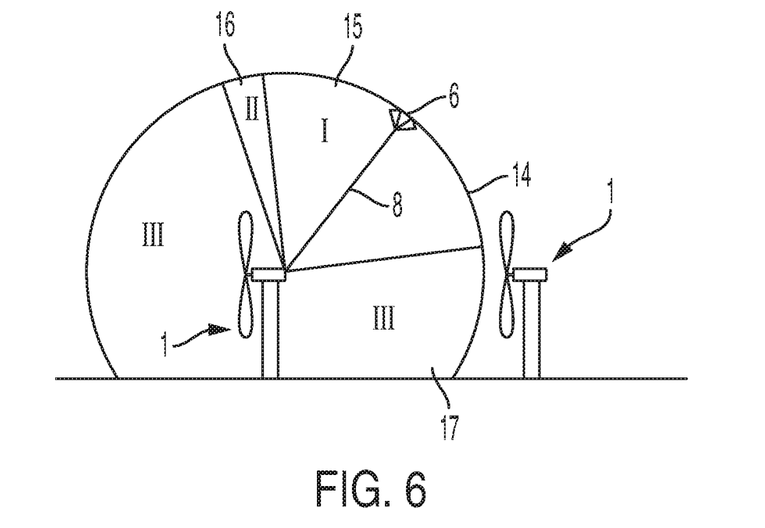
FIGS. 6-11 illustrate wind parks according to three different embodiments and with different zones defined for the control.

FIG. 6 illustrates two wind turbines with a kite placed on an upfront wind turbine. The cable length which is part of the control parameters of the kite is below the distance to the wind turbine behind, or even below the distance including a safety margin.

A sphere 14 is defined by the length of the cable, and the sphere is divided into three different zones I, II, and III. There are the following rules for the zone:

Zone I, position no 15. This could be considered as a green zone in which operation of the park is considered unproblematic, and a first, standard set of control parameters may be applied. I.e. the airborne unit is allowed to continue in its position while the wind turbine rotor rotates. Zone I may correspond to what herein is referred to as the first zone.

Zone II, position no 16. This may be considered as a yellow zone in which a Warning is issued. In this zone a second set of control parameters may be applied due to the increased risk of collision, i.e. e.g. for bringing the airborne unit into zone I. Zone II may correspond to what herein is referred to as the second zone.

Zone III, position no 17. This may be considered as a red zone in which an Alarm is issued. In this operation is not allowed, and a second set of control parameters may be applied for emergency stopping the operation of the wind turbine and/or for brining the airborne unit down. Zone III may correspond to what herein is referred to as the third zone.

Figure 7:
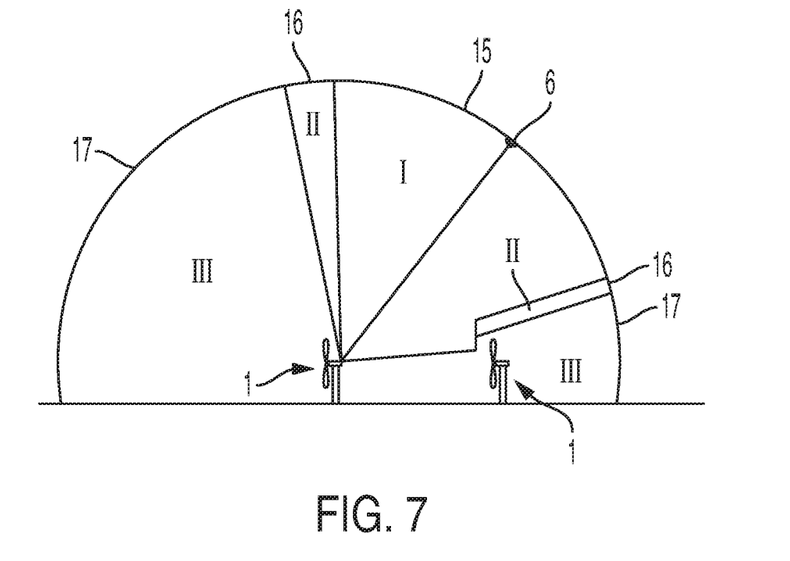

FIG. 7 illustrates essentially the same zone definition illustrated in FIG. 6 but for the situation where the rope length is above the distance to the wind turbine behind/nearest wind turbine. An additional warning zone II is found above the wind turbine which is behind the airborne wind energy system.

Figure 8:
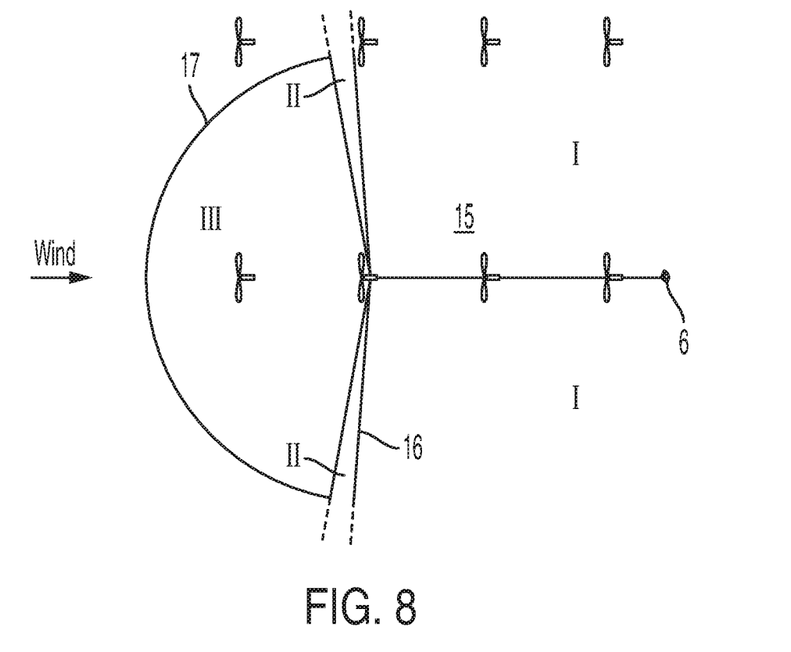

FIG. 8 illustrates a wind park seen from above with an airborne wind energy system connected at one of the wind turbines. The height of the airborne unit is above the maximum blade tip height for the wind turbine including a safety margin. Zones I, II, and III in the same horizontal plane is illustrated. Of course one or more kites can be placed in a park and in such case, zones are made for each kite and further a method for preventing collision of kites with ropes are implemented.

Figure 9:
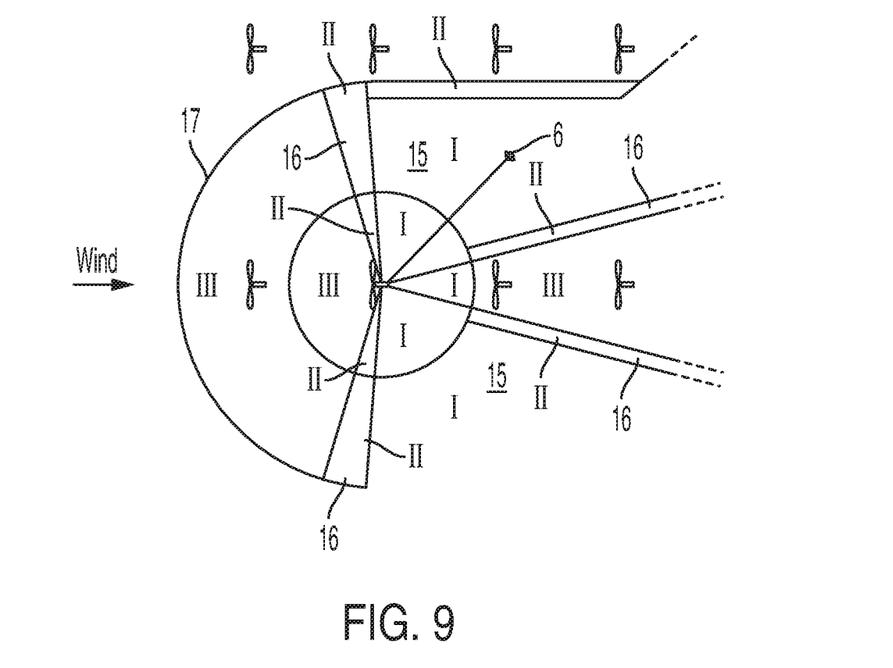

FIG. 9 illustrates the view from FIG. 3 but for the situation where the height of the airborne unit is below the maximum blade tip height for the wind turbine (including the safety margin). Zones I, II, and III are in the same horizontal plane.

Figure 10:
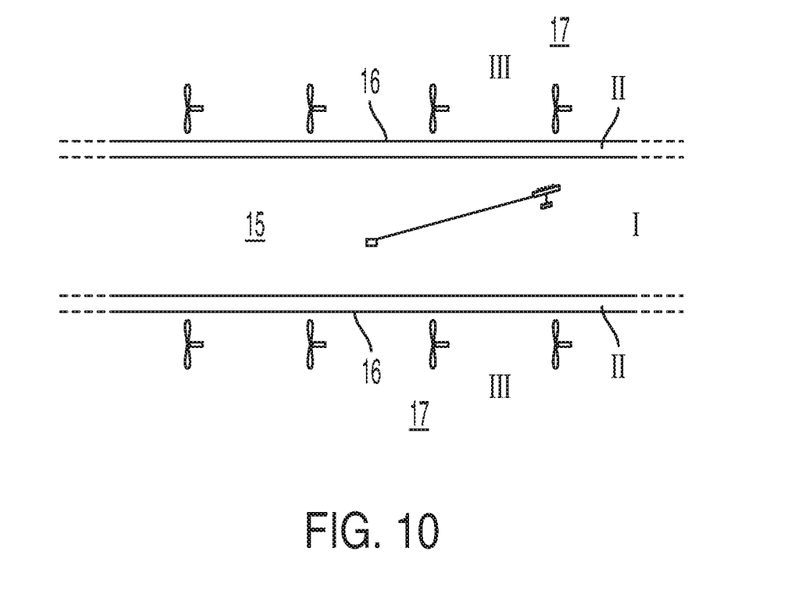

FIG. 10 illustrates a wind park seen from above with an airborne unit connected to a base within the wind turbine park. Zones I, II, and III are illustrated for the situation where the height of the airborne unit is below the maximum blade tip height of the wind turbine+a safety margin.

Figure 11:
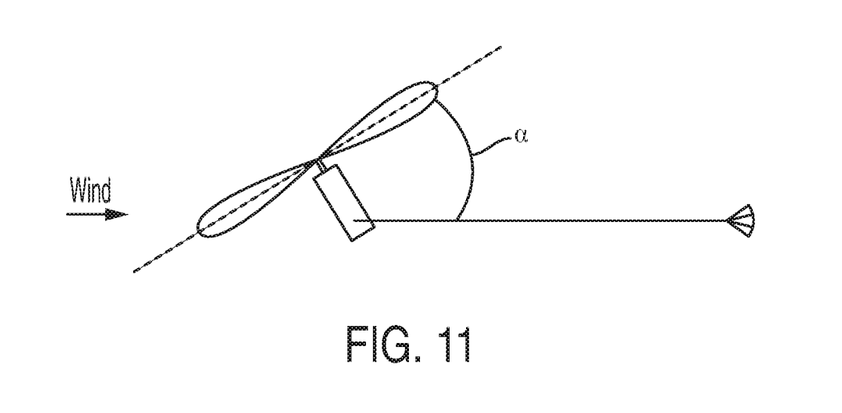

FIG. 11 illustrates an upwind wind turbine operating with yaw error and an airborne wind energy system connected to the wind turbine. The angle, alfa, is the angle between the rotor plane and the cable which connects the airborne unit to the base. The air borne unit will be in respectively zone I, II, or III depending on the value of alfa.

The invention claimed is:

1. A method of controlling a wind park comprising one or more wind turbines, one or more airborne wind energy systems, and a computer system, each of the one or more wind turbines comprising a tower, at least one nacelle mounted on the tower, and a rotor coupled to the at least one nacelle and rotatable about a rotation axis for generating electrical energy for a power grid, each of the one or more airborne wind energy systems comprising an airborne unit, a base, and a cable connecting the airborne unit to the base, and the computer system controlling at least one of the one or more wind turbines and at least one of the one or more airborne wind energy systems based on a set of control parameters, the method comprising the steps of:

defining, for at least one of the one or more airborne wind energy systems, a first zone and a second zone such that a risk of a collision between a part of the at least one of the one or more airborne wind energy systems and a part of the at least one of the one or more wind turbines is higher when the airborne unit of the at least one of the one or more airborne wind energy systems is in the second zone than when the airborne unit of the at least one of the one or more airborne wind energy systems is in the first zone, operating the airborne unit of the at least one of the one or more airborne wind energy systems in each of the first zone and the second zone, determining a position of the airborne unit of the at least one of the one or more airborne wind energy systems, in response to the airborne unit being in the first zone, controlling the at least one of the one or more wind turbines and the at least one of the one or more airborne wind energy systems based on a first set of control parameters to continue operating the airborne unit of the at least one of the one or more airborne wind energy systems in the first zone while the rotor of the one or more wind turbines rotates, and in response to the airborne unit being in the second zone, controlling the at least one of the one or more wind turbines and the at least one of the one or more airborne wind energy systems based on a second set of control parameters that bring the position of the airborne unit of the at least one of the one or more airborne wind energy systems into the first zone.

2. The method according to claim 1, further comprising the steps of:

defining a third zone in which the collision between the at least one of the one or more wind turbines and the at least one of the one or more airborne wind energy systems is more likely to occur than in the second zone, operating the airborne unit of the at least one of the one or more airborne wind energy systems in the third zone, and in response to the airborne unit being in the third zone, controlling the at least one of the one or more wind turbines and the at least one of the one or more airborne wind energy systems based on a third set of control parameters that bring down the airborne unit of the at least one of the one or more airborne wind energy systems and stop operation of the at least one of the one or more wind turbines.

3. The method according to claim 1, further comprising the step of redefining at least one of the first zone and the second zone based on an operating condition of the at least one of the one or more wind turbines or the at least one of the one or more airborne wind energy systems of the wind park.

4. The method according to claim 3, wherein the step of redefining the at least one of the first zone and the second zone is carried out while electrical energy is generated.

5. The method according to claim 3, wherein the step of redefining the at least one of the first zone and the second zone is carried out continuously.

6. The method according to claim 1, further comprising the step of redefining at least one of the first zone and the second zone based on a control parameter of one of the first set of control parameters or the second set of control parameters being used to control the at least one of the one or more wind turbines or the at least one of the one or more airborne wind energy systems of the wind park.

7. The method according to claim 1, further comprising the step of defining at least one of the first zone and the second zone as a static zone which is not re-definable.

8. The method according to claim 1, wherein the computer system is configured to define the first set of control parameters, the second set of control parameters, the first zone, and the second zone.

9. The method according to claim 1, wherein at least one of the first set of control parameters and the second set of control parameters comprises at least one of an orientation of the rotation axis, a length of the cable, a cable roll in and out speed, a speed of the rotor, a position of one or more blades of the rotor, and a position of the airborne unit of the at least one of the one or more airborne wind energy systems.

10. The method according to claim 1, wherein each of the first set of control parameters and the second set of control parameters is applied to more than one of the one or more wind turbines or more than one of the one or more airborne wind energy systems of the wind park.

11. A wind park, comprising:

one or more wind turbines each comprising a tower, at least one nacelle mounted on the tower, and a rotor coupled to the at least one nacelle and rotatable about a rotation axis for generating electrical energy for a power grid, one or more airborne wind energy systems each comprising an airborne unit, a base, and a cable connecting the airborne unit to the base, an electronic data storage that stores a data set for at least one of the one or more airborne wind energy systems, the data set comprising at least a first zone data set defining a first zone, and a second zone data set defining a second zone in which a collision between at least one of the one or more wind turbines and the at least one of the one or more airborne wind energy systems is higher than in the first zone, an electronic controller operable on data in the data storage, and a global positioning system configured for determining a position of the airborne unit of the at least one of the one or more airborne wind energy systems, the electronic controller being configured to process the position and the first zone data set and the second zone data set, and based thereon to:

determine if the airborne unit of the at least one of the one or more airborne wind energy systems is in the first zone or in the second zone, in response to the airborne unit being in the first zone, control the at least one of the one or more wind turbines and the at least one of the one or more airborne wind energy systems based on a first set of control parameters to continue operating the airborne unit of the at least one of the one or more airborne wind energy systems in the first zone while the rotor of the one or more wind turbines rotates, and in response to the airborne unit being in the second zone, control the at least one of the one or more wind turbines and the at least one of the one or more airborne wind energy systems based on a second set of control parameters that bring the position of the airborne unit of the at least one of the one or more airborne wind energy systems into the first zone.

12. The wind park according to claim 11,
wherein the electronic data storage comprises at least a third zone data set defining a third zone in which the collision between the at least one of the one or more wind turbines and the at least one of the one or more airborne wind energy systems is more likely to occur than in the second zone, and
wherein the electronic controller is configured to control the at least one of the one or more wind turbines and the at least one of the one or more airborne wind energy systems based on a third set of control parameters that bring down the airborne unit of the at least one of the one or more airborne wind energy systems in response to the airborne unit being within the third zone.

13. The wind park according to claim 11, wherein the electronic controller is configured to redefine at least one of the first zone and the second zone based on a wind speed, a wind direction, a length of the cable, and a position of one or more blades of the rotor.

14. The wind park according to claim 13, wherein the electronic controller is configured to redefine at least one of the first zone and the second zone while electrical energy is generated.

15. The wind park according to claim 13, wherein the electronic controller is configured to redefine at least one of the first zone and the second zone while at least one of the first set of control parameters and the second set of control parameters is used by the electronic controller to control operation of the at least one of the one or more wind turbines and the at least one of the one or more airborne wind energy systems.

16. The wind park according to claim 13, wherein the electronic controller is configured to redefine at least one of first zone and the second zone continuously.

* * * * *